United States Patent
Lehmann et al.

(10) Patent No.: US 12,459,812 B2
(45) Date of Patent: Nov. 4, 2025

(54) PARTIAL OXIDATION REACTOR WITH WARM-UP BURNER FOR PRODUCTION OF SYNTHESIS GAS

(71) Applicant: L'Air Liquide, Société Anonyme pour l'Etude et l'Exploitation des Procédés Georges Claude, Paris (FR)

(72) Inventors: Maik Lehmann, Frankfurt am Main (DE); Alexander Roesch, Butzbach (DE)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 442 days.

(21) Appl. No.: 17/975,050

(22) Filed: Oct. 27, 2022

(65) Prior Publication Data
US 2023/0125763 A1 Apr. 27, 2023

(30) Foreign Application Priority Data
Oct. 27, 2021 (EP) .................................... 21020530

(51) Int. Cl.
| | |
|---|---|
| C01B 3/36 | (2006.01) |
| C10J 3/50 | (2006.01) |
| F23C 5/02 | (2006.01) |
| F23D 14/22 | (2006.01) |
| F23D 14/66 | (2006.01) |

(52) U.S. Cl.
CPC ............... *C01B 3/363* (2013.01); *C10J 3/506* (2013.01); *F23C 5/02* (2013.01); *F23D 14/22* (2013.01); *F23D 14/66* (2013.01); *C01B 2203/025* (2013.01); *C01B 2203/0816* (2013.01); *C10J 2300/1823* (2013.01); *C10J 2300/1846* (2013.01); *F23D 2207/00* (2013.01)

(58) Field of Classification Search
CPC . C01B 3/363; F23C 5/02; F23D 14/22; F23D 14/66; C10J 3/506
USPC ......................................... 431/8, 5, 181–183
See application file for complete search history.

(56) References Cited

U.S. PATENT DOCUMENTS

| | | | |
|---|---|---|---|
| 4,988,287 A * | 1/1991 | Stegelman | ............. F23D 14/66 |
| | | | 431/351 |
| 5,549,877 A | 8/1996 | Gateau et al. | |
| (Continued) | | | |

FOREIGN PATENT DOCUMENTS

| | | |
|---|---|---|
| CN | 1 275 848 C | 9/2006 |
| CN | 102 275 872 | 12/2011 |
| (Continued) | | |

OTHER PUBLICATIONS

European Search Report for corresponding EP 21020530, Apr. 14, 2022.

*Primary Examiner* — Vivek K Shirsat
(74) *Attorney, Agent, or Firm* — Elwood L. Haynes (57) ABSTRACT

The invention relates to a partial oxidation reactor (POX reactor) having a warm-up burner for producing synthesis gas by partial oxidation of fluid carbon-containing fuels in the presence of an oxygen-containing oxidant and to a process for startup of the partial oxidation reactor According to the invention the preheating of the partial oxidation reactor is carried out via a dedicated warm-up burner which is introduced via one of the media channels of the POX burner without any need to deinstall the entire POX burner.

11 Claims, 5 Drawing Sheets

(56) References Cited

U.S. PATENT DOCUMENTS

| | | | |
|---|---|---|---|
| 7,270,539 B1* | 9/2007 | Sujata | F23G 7/008 |
| | | | 110/238 |
| 2008/0141588 A1 | 6/2008 | Kirchhubel et al. | |
| 2012/0298922 A1 | 11/2012 | Mueller-Hagedorn et al. | |
| 2023/0125763 A1* | 4/2023 | Lehmann | C01B 3/363 |
| | | | 431/8 |

FOREIGN PATENT DOCUMENTS

| | | |
|---|---|---|
| DE | 43 06 980 | 9/1994 |
| DE | 10 2006 059149 B4 | 6/2009 |
| DE | 10 2010 004787 A1 | 7/2011 |
| EP | 0 936 182 | 8/1999 |
| WO | WO 2015 155256 | 10/2015 |

* cited by examiner

PARTIAL OXIDATION REACTOR WITH WARM-UP BURNER FOR PRODUCTION OF SYNTHESIS GAS

CROSS REFERENCE TO RELATED APPLICATIONS

This application claims the benefit of priority under 35 U.S.C. § 119 (a) and (b) to European Patent Application No. 21020530.8, filed Oct. 27, 2021 the entire contents of which are incorporated herein by reference.

FIELD OF THE INVENTION

The invention relates to a partial oxidation reactor (POX reactor) having a warm-up burner for producing synthesis gas by partial oxidation of fluid carbon-containing fuels in the presence of an oxygen-containing oxidant and to a process for startup of the partial oxidation reactor.

BACKGROUND

Synthesis gases are gas mixtures containing hydrogen and carbon oxides which are used in various synthesis reactions. Examples thereof are methanol synthesis, oxo synthesis, the production of ammonia by the Haber-Bosch process or Fischer-Tropsch synthesis. One option for producing such synthesis gases is the partial oxidation of fluid, conveyable carbon-based inputs, for example gases such as natural gas, liquids such as crude oil or refinery waste streams, carbon-containing suspensions or finely divided carbon-containing solids particles provided as an entrained flow, in a partial oxidation reactor which comprises essentially a reactor vessel and a burner (partial oxidation partner, POX burner) typically arranged on the inlet side which is gastightly connectable to said vessel by means of a first detachable connecting device.

A commonly used process for producing synthesis gases is autothermal entrained flow gasification of gaseous, liquid or solid fuels, as described for example in patent specification DE 10 2006 059 149 B4. At the top of a reactor an ignition and pilot burner is arranged centrally and three gasification burners are arranged with rotational symmetry to the reactor axis. Via the gasification burners coal dust with oxygen and steam as gasification agents is supplied to a gasification space of the reactor in which the fuel is converted into synthesis gas. The hot gasification gas exits the gasification space together with the liquid slag and passes into a quench space into which water is injected for cooling of raw gas and slag. The slag is deposited in the water bath and is removed via a slag discharge. The quenched raw gas is withdrawn from the quench space in a steam-saturated state and purified in subsequent purification stages. Since the fuel is directly reacted with the oxidant, oxidant and fuel are advantageously supplied coaxially or coannularly.

U.S. Pat. No. 5,549,877 A1 also describes a process and an apparatus for producing synthesis gas, wherein an oxygen-containing oxidant is supplied centrally at the top of the reactor and introduced, together with fuel introduced annularly around the oxidant feed, into the reaction space where the fuel is initially converted substoichiometrically. A flame which spreads downwards into the reaction space is formed. In a recirculation zone the materials present in the flame flow back in the upward direction. An additional stream of oxidant is supplied into the reaction zone downstream via an annular conduit, thus forming a more extended flame zone.

The invention taught in DE laid-open specification DE 10 2010 004 787 A1 relates to the production of synthesis gas by partial oxidation of liquid or gaseous carbon-containing fuel in the presence of an oxygen-containing oxidant using a burner of simple construction, wherein the fuel, the oxidant and a moderator are supplied to the burner separately and wherein the fuel and the moderator are mixed in a mixing chamber of the burner before they are brought into contact with the oxidant. In order to reduce the load on the burner during operation under transient conditions the oxidant is introduced into a combustion chamber of the burner centrally via an outlet opening and the mixture of fuel and moderator is introduced into the combustion chamber concentrically around the oxidant via the outlet opening.

Startup of partial oxidation reactors of the described type requires preheating of the apparatus, in particular of the reactor vessel. To this end, international patent application WO 2015/155256 A1 and European patent application EP 0936182 A2 for example propose heating the refractory lining of the reactor vessel by circulation therethrough of hot heating gas generated externally using an auxiliary plant. In addition, the composition of the process gas stream is said to be altered to such an extent that a lower autoignition temperature results. This has the advantage that a dedicated auxiliary plant for hot gas generation is required. In addition, varying the composition of the process gas stream is possible only within certain limits that are predetermined for example by the conveyability of the carbon-containing fluid and safety aspects such as explosive limits.

Since POX reactors of the described type often do not comprise a dedicated permanently installed ignition or warm-up burner, a further customary method of preheating is to utilize the POX burner itself for the heating of the reactor vessel. However, since the POX burner often does not have a dedicated ignition burner or pilot burner the reactor vessel must initially be heated to above the autoignition temperature of a supplied fuel-oxidant mixture by other means. This is performed as follows:

The POX burner is separated from the reactor vessel and removed by detaching the first detachable connecting device, for example the main flange between the reactor vessel and the POX burner.

A dedicated warm-up burner having an ignition apparatus is gastightly connected to the reactor vessel via the first detachable connecting device and the reactor vessel is heated by combustion of a fuel gas-oxidant mixture.

After achieving a previously specified target temperature, for example in the temperature range between 1000° C. and 1300° C., the fuel gas-oxidant feed to the warm-up burner is terminated, the first detachable connecting device is detached, the warm-up burner is removed and the POX burner is installed and gastightly connected to the reactor vessel by means of the first detachable connecting device.

The fluid carbon-containing fuel and the oxygen-containing oxidant are then supplied to the POX burner. Onset of the combustion by autoignition of the substance mixture occurs and the POX reactor is heated further.

Once the desired POX reaction temperature has been achieved the partial oxidation reaction is brought online by suitable adjustment of the material streams of the fluid carbon-containing fuel, of the oxygen-containing oxidant and optionally of a moderator, for example steam or carbon dioxide.

The described procedure is time-consuming and also entails a number of safety hazards for the personnel performing these operations. During substitution it must be ensured that the POX reactor is at negative pressure to avoid hot gases exiting the flange opening and injuring personnel. During burner substitution the temperature must not fall below the commencement temperature for the partial oxidation otherwise the warm-up burner must be reinstalled and the heating repeated.

There is therefore a need for a simple and safe process for startup of a POX reactor and to an apparatus which makes this possible.

SUMMARY

It is accordingly an object of the present invention to specify a partial oxidation reactor (POX reactor) having a warm-up burner for producing synthesis gas by partial oxidation of fluid carbon-containing fuels in the presence of an oxygen-containing oxidant and to a process for startup of the partial oxidation reactor, which do not exhibit the recited disadvantages of the prior art.

In a first aspect of the invention this object is achieved by a partial oxidation reactor (POX reactor) having a warm-up burner for producing synthesis gas by partial oxidation of fluid carbon-containing fuels in the presence of an oxygen-containing oxidant having the features of claim 1 and in a twelfth aspect of the invention by a process for startup of a partial oxidation reactor (POX reactor) for producing synthesis gas by partial oxidation of fluid carbon-containing fuels in the presence of an oxygen-containing oxidant. Further alternative or preferred aspects of the invention are apparent from the subsidiary claims of the respective category.

Fluid carbon-containing fuels are to be understood as meaning substances or substance mixtures which flow under the action of shear forces, i.e. essentially gases or liquids but also suspensions or aerosols, and contain carbon or carbon-containing compounds. Examples include gases such as natural gas, liquids such as crude oil or refinery waste streams, carbon-containing suspensions (so-called slurries) or finely divided carbon-containing solids particles provided as an entrained flow.

Oxygen-containing oxidants are to be understood as meaning substances or substance mixtures which contain oxygen in elemental, molecular form and which are in pure form or in the form of a mixture. Examples include air or pure oxygen gas or oxygen-enriched air. In a broader sense, such oxidants are also to be understood as meaning substances or substance mixtures containing oxygen in a form which is chemically bonded but can be liberated under the conditions of the partial oxidation, one example being dinitrogen oxide $N_2O$.

The statement that two bodies, for example the constituents of a connecting device or securing elements, are connectable in detachable fashion is to be understood as meaning that these may be reversibly separated in purely mechanical and nondestructive fashion, i.e. without overcoming chemical bonding forces, and reconnected again in purely mechanical fashion. For this reason, positive locking methods and frictional joining methods, in particular, are encompassed by this type of connection. Positively locked connections are established by the shaping of the bodies to be connected. Frictional connections are held together by frictional forces. As examples of reversibly detachable connections, mention may be made of plugging-in, screw connections, clamping and rivet connections since although the rivets have to be destroyed for separation, the connected components do not have to be.

In contrast thereto, the statement that two bodies, for example the constituents of a connecting device, cannot be connected in a reversibly detachable manner means that chemical bonding forces have to be overcome to release the connection, resulting in some destruction of at least the connecting material. Such connections are also referred to as substance-to-substance bonds which produce a connection in the material itself. These include welded and soldered joints and also adhesive bonds. A characteristic here is that when a connection between the previously separated bodies is re-established, it is necessary to re-apply an auxiliary, for example welding means, solder or adhesive.

A detachable connecting device requires sealing elements which ensure the gastightness of the connection and detachable securing elements which bring about, for example, a frictional connection of the parts of the connecting device. One example is a flange connection, wherein the parts of the connecting device are pipe pieces provided with flanges, between which a sealing element, for example an annular gasket, is arranged and which are frictionally sealed with bolts and nuts as detachable securing elements.

Conditions of partial oxidation are to be understood as meaning the reaction and process conditions known per se to a person skilled in the art, in particular of temperature, pressure and residence time, as recited by way of example above and discussed in detail in the relevant literature and under which there is at least partial conversion but preferably industrially relevant conversions of the reactants to synthesis gas products such as CO and hydrogen.

The requirement that the feed channels are configured such that mixing of the fuel, the moderator and the oxidant occurs only outside the burner is met when the size of the cross sectional areas of the feed channels relative to the target volume flow passing through is chosen such that correspondingly high flow velocities are achieved.

The invention is based on the finding that in the case of a partial oxidation reactor it is advantageous to introduce the warm-up burner through one of the media channels (synonymous with feed channels) instead of opening the first detachable connecting device between the POX burner and the reactor vessel and completely removing the POX burner.

POX burners in the context of the present invention comprise coaxially and concentrically arranged tubes of preferably circular cross section, wherein the central tube and the annular gaps formed by further tubes in each case coaxially and concentrically surrounding the central tubes act as media channels/feed channels. According to the invention one or more of the coaxially and concentrically arranged tubes, for example the central tube and optionally also further tubes from the inside outwards or all tubes except the outermost tube are deinstalled. The remaining tubes, for example the outermost tube, are used to introduce a warm-up burner comprising an ignition apparatus and a flame monitoring system into the reactor.

One advantage of this approach is that it is no longer necessary to open the first detachable connecting device between the POX burner and the reactor vessel and remove the POX burner, a second detachable connecting device, which in the installed state of the POX burner gastightly connects one portion of the coaxially and concentrically arranged tubes to the remaining tubes, instead being opened. This second detachable connecting device may likewise be in the form of a flange. It is advantageous for the second detachable connecting device to be smaller than the first detachable connecting device, for example the main flange between the POX burner and the reactor vessel, since a smaller connecting device is quicker to deinstall and reinstall and easier to seal. When both connecting devices are configured as a flange for example, the smaller flange of the second detachable connecting device has fewer bolt holes, with the result that deinstalling and reinstalling may be performed more quickly than in the case of the main flange between the POX burner and the reactor vessel. The bolts and optionally nuts which connect the inner tube/the inner tubes to the rest of the POX burner are generally smaller and present in smaller numbers. It is therefore easier and less time-consuming to tighten them. It is moreover easier to produce a gastight connection with the sealing element used in the second, smaller connecting device, for example an annular gasket in the case of a flange connection, since the risk of leaks due to nonuniform tightening is reduced due to the smaller number of bolts. In addition, the second detachable connecting device is subjected to a lower thermal load than the first detachable connecting device, since the first detachable connecting device is subjected to greater thermal radiation on account of its greater proximity to the combustion zone, thus increasing the risk of leaks due to thermal expansion of its constituents. There is finally also a reduced risk of damage when the first detachable connecting device, for example the main flange between the POX burner and the reactor vessel, requires opening less frequently.

The warm-up burner is introduced into the POX reactor via the remaining tube(s) of the POX burner and gastightly connected to the POX burner by means of the second detachable connecting device. The heating process is commenced by ignition of the warm-up burner and operated until the required autoignition temperature for a fuel-oxidant mixture has been achieved. In the case of natural gas this may be for example 600° C., wherein heating is preferably carried out to a slightly higher temperature, for example 750° C., to safely ensure autoignition of the fuel-oxidant mixture without any need for a dedicated ignition apparatus at the POX burner, As soon as the reactor vessel has achieved the required autoignition temperature the warm-up burner is removed and the deinstalled feed tubes of the POX burner are reinstalled. Then, either the partial oxidation is already commenced by supplying the liquid carbon-containing fuel and oxygen-containing oxidant or the partial oxidation reactor is heated further by further supplying a fuel, for example of natural gas, and the oxygen-containing oxidant until the autoignition temperature for the partial oxidation reaction mixture of fluid carbon-containing fuel and oxygen-containing oxidant has been achieved. It is once again preferable to carry out heating to a slightly higher temperature of for example above 1100° C. to safely ensure autoignition of the partial oxidation reaction mixture. The partial oxidation reaction is then brought online by supplying the corresponding media, without any need for ignition using an ignition apparatus at the POX burner.

Since this allows burner substitution to be performed at lower temperatures, i.e. for example at 750° C. instead of at over 1100° C., this results in lower thermal radiation exposure of the operating personnel and a lower temperature drop during burner substitution.

In a second aspect of the invention the partial oxidation reactor is characterized in that the warm-up burner comprises the following constituents:

(c2) a burner outer wall of the warm-up burner having a second detachable connecting device for gastightly connecting the warm-up burner to the central first feed channel, to the second feed channel, to the outermost feed channel or to an optional further feed channel of the POX burner.

Depending on the space requirements of the warm-up burner there are thus numerous options for providing a suitable installation opening therefor.

In a third aspect of the invention the partial oxidation reactor is characterized in that the warm-up burner comprises an electrical ignition apparatus. This ensures a reliable ignition procedure for the fuel-oxidant mixture.

In a fourth aspect of the invention the partial oxidation reactor is characterized in that the warm-up burner comprises a flame detector.

In a fifth aspect of the invention the partial oxidation reactor is characterized in that the reactor vessel comprises a temperature measuring apparatus for determining the internal temperature of the reactor vessel, preferably of the inner wall of the reactor vessel.

In a sixth aspect of the invention the partial oxidation reactor is characterized in that at least one of the feed channels of the POX burner is provided with a turbulizing means which endows the corresponding media stream with a swirl around the longitudinal axis of the burner and perpendicular to the flow direction. This improves the mixing of the corresponding medium with the medium exiting the adjacent flow channel. The mixing is preferably effected exclusively outside the burner, with no backmixing with media fractions still present inside the burner which could lead to undesired oxidation reactions inside the burner.

In a seventh aspect of the invention the partial oxidation reactor is characterized in that at least two of the feed channels are provided with turbulizing means, wherein the directions of rotation with which the media flowing through the at least two feed channels are endowed are opposed relative to the longitudinal axis of the burner. This still further improves the mixing of the corresponding medium with the medium exiting the adjacent flow channel.

In an eighth aspect of the invention the partial oxidation reactor is characterized in that the feed channels of the POX burner are configured such that a mixing of the fuel, the moderator and the oxidant occurs only outside the burner. This ensures that all media exit the burner simultaneously and unmixed, so that oxidation reactions inside the burner are avoided.

In a ninth aspect of the invention the partial oxidation reactor is characterized in that the reactor vessel is provided with a refractory liner or lining.

In a tenth aspect of the invention the partial oxidation reactor is characterized in that the POX burner is operated without separately supplied cooling media. This is made possible for example as a result of the exothermic oxidation reactions occurring exclusively in the reactor vessel and not inside the burner due to the configuration of the burner, for example via a suitable configuration of the feed channels of the POX burner. This makes it possible to dispense with trouble-prone supply of a fluid coolant. It is possible to take measures against the radiative heat acting on the burner from the reaction chamber through appropriate material selection/ attachment of an insulating layer. Since channels for cooling media having their own space requirements need not be provided either, the deinstallation and installation of the inner tubes of the POX burner and of the warm-up burner is easier.

In an eleventh aspect of the invention the partial oxidation reactor is characterized in that the first detachable connecting device and the second detachable connecting device are configured as flanges which each comprise at least one sealing element and a multiplicity of detachable securing elements, wherein the at least one sealing element of the second detachable connecting device is smaller than the at least one sealing element of the first detachable connecting device, the multiplicity of detachable connecting elements for the second detachable connecting device is smaller than the multiplicity of connecting elements for the first detachable connecting device.

This has the advantage that a smaller connecting device is quicker to deinstall and reinstall and easier to seal. When both connecting devices are configured as a flange for example, the smaller flange of the second detachable connecting device has fewer bolt holes, with the result that deinstalling and reinstalling may be performed more quickly than in the case of the main flange between the POX burner and the reactor vessel as the first detachable connecting device. The bolts and optionally nuts which connect the inner tube/the inner tubes to the rest of the POX burner are then smaller and present in smaller numbers. It is therefore easier and less time-consuming to tighten them. It is moreover easier to produce a gastight connection with the sealing element used in the second, smaller connecting device, for example an annular gasket in the case of a flange connection, since the risk of leaks due to nonuniform tightening is reduced due to the smaller number of bolts.

In a thirteenth aspect of the invention the process for startup of a partial oxidation reactor is characterized in that the first target internal temperature of the reactor vessel, preferably the temperature of the inner wall of the reactor vessel, is specified to a temperature between 600° C. and 1000° C., preferably between 700° C. and 800° C., the second target internal temperature of the reactor vessel, preferably the temperature of the inner wall of the reactor vessel, is specified to a temperature between 800° C. and 1300° C., preferably between 1000° C. and 1200° C.

The heating process is commenced by ignition of the warm-up burner and operated until the first target internal temperature of the reactor vessel, which corresponds to the autoignition temperature of a fuel-oxidant mixture, for example natural gas-air, is achieved. In the case of natural gas as fuel this may be for example about 600° C., wherein heating is preferably carried out to a slightly higher temperature between 600° C. and 1000° C., preferably between 700° C. and 800° C., for example 750° C., to safely ensure autoignition of the fuel-oxidant mixture without any need for a dedicated ignition apparatus at the POX burner.

As soon as the reactor vessel has achieved the required autoignition temperature the warm-up burner is removed and the deinstalled feed tubes of the POX burner are reinstalled. The partial oxidation reactor is then heated further by further supplying a fuel, for example natural gas, and the oxygen-containing oxidant until the second target internal temperature of the reactor vessel, which corresponds to the autoignition temperature of the partial oxidation reaction mixture of fluid carbon-containing fuel and oxygen-containing oxidant, is achieved. It is once again preferable to carry out heating to a slightly higher temperature between 800° C. and 1300° C., preferably between 1000° C. and 12 000° C., for example about 1100° C., to safely ensure autoignition of the partial oxidation reaction mixture. The partial oxidation reaction is then brought online by supplying the corresponding media, without any need for ignition using an ignition apparatus at the POX burner.

Since this allows burner substitution to be performed at lower temperatures, i.e. for example at 750° C. instead of at over 1100° C., this results in lower thermal radiation exposure of the operating personnel and a lower temperature drop during burner substitution.

BRIEF DESCRIPTION OF THE DRAWINGS

Developments, advantages and possible applications of the invention are also apparent from the following description of exemplary embodiments and the drawing. The invention is formed by all of the features described and/or depicted, either on their own or in any combination, irrespective of the way they are combined in the claims or the dependency references therein.

DETAILED DESCRIPTION OF PREFERRED EMBODIMENTS

Figure 1:
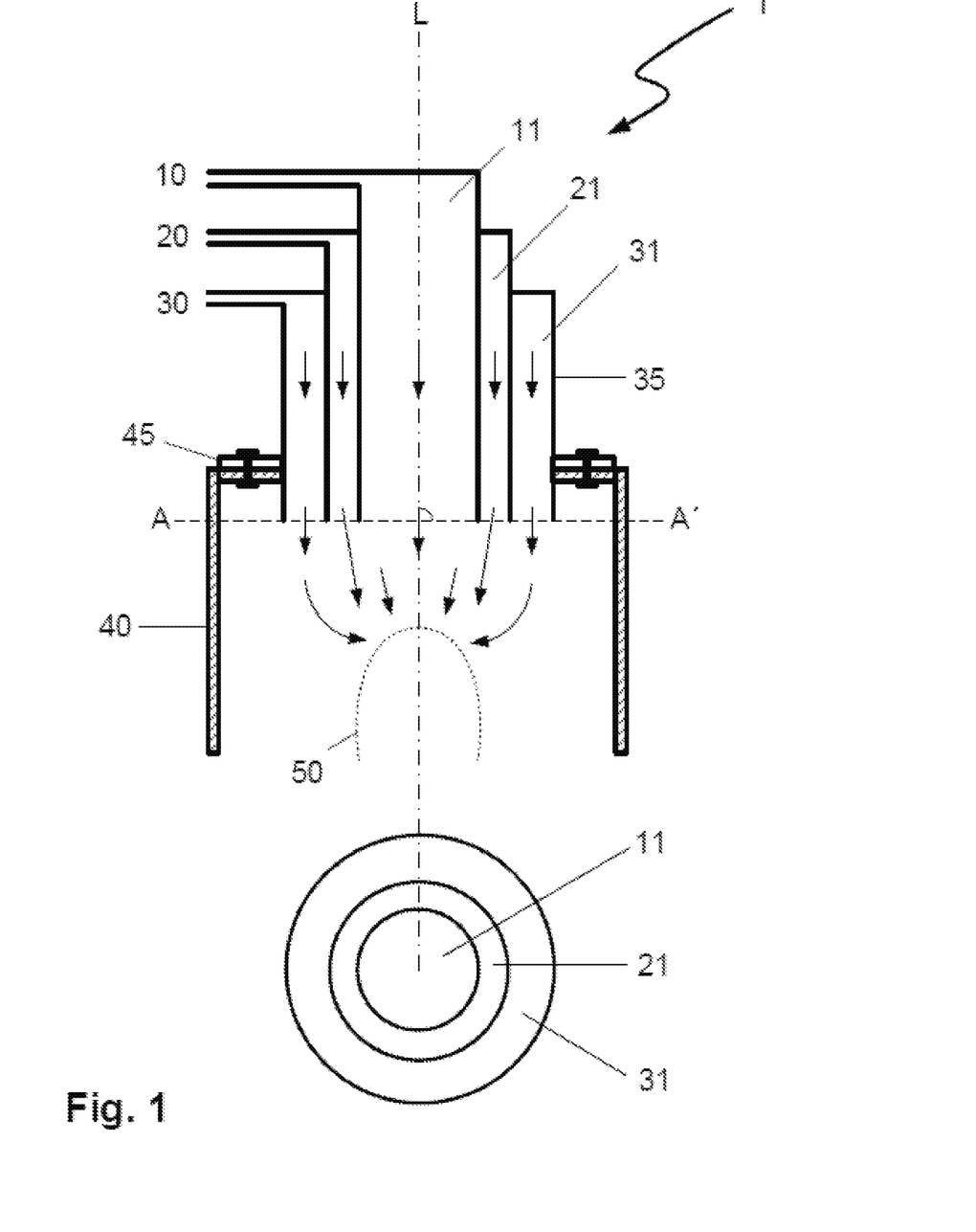
FIG. 1 shows a POX reactor with coaxial circular/annular media channels according to the prior art.

The inventive partial oxidation reactor comprising POX burner 1 shown in FIG. 1 is supplied via conduits 10, 20 and 30 with the oxidant, for example pure oxygen or air, the moderator, for example a steam/carbon dioxide mixture or each of these media individually, and the fluid carbon-containing fuel, for example natural gas. The oxidant is passed via conduit 10 into the central first feed channel 11 having a circular cross section. The second feed channel 21 surrounds the first feed channel coaxially and concentrically; the annular gap thus formed between the outer wall of the first feed channel and the inner wall of the second feed channel serves to accommodate the moderator provided via conduit 20. The burner further comprises a third feed channel 31 coaxially and concentrically surrounding the second feed channel, wherein an annular gap through which the fuel provided via conduit 30 is supplied is formed between the outer wall of the second feed channel and the inner wall of the third feed channel and wherein the outer wall of the third feed channel forms the burner outer wall 35.

The burner outer wall 35, the dividing wall between the second and the third feed channel 31, 21 and the dividing wall between the first and the second feed channel 21, 11 may optionally terminate in a common plane A-A' which runs perpendicularly to the longitudinal axis L of the burner and forms the burner opening. This has the advantages elucidated above, in particular that a mixing of the media occurs only outside the burner; this special embodiment is, however, not absolutely necessary for the fundamental mode of operation of the invention. In this embodiment means or apparatuses for passing a fluid coolant through the POX burner can optionally be dispensed with.

The POX burner is connected to the reactor vessel 40 by means of the first detachable connecting device 45. This is shown as a flange here. Two bolt-and-nut pairs for securing are shown.

In the present example the partial oxidation of the natural gas proceeds to form a flame 50 which is indicated with a dashed line.

Figure 2:
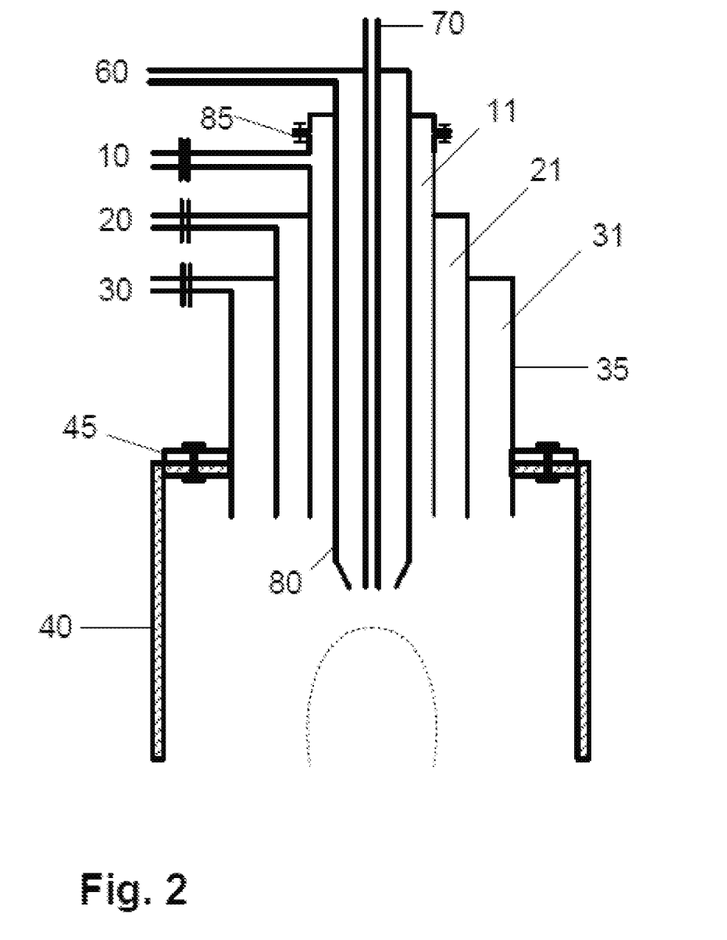
FIG. 2 shows a POX reactor according to the invention with an installed warm-up burner.

FIG. 2 shows a POX reactor according to the invention with an installed warm-up burner 80. This comprises feed conduits 60, 70 for a fuel gas, in the present case natural gas, and for the oxygen-containing oxidant, in the present case the air. In the exemplary embodiment of FIG. 2 the warm-up burner was introduced into the POX burner via the central first feed channel and connected to the POX burner by means of the second detachable connecting device 85 (burner flange).

Figure 3:
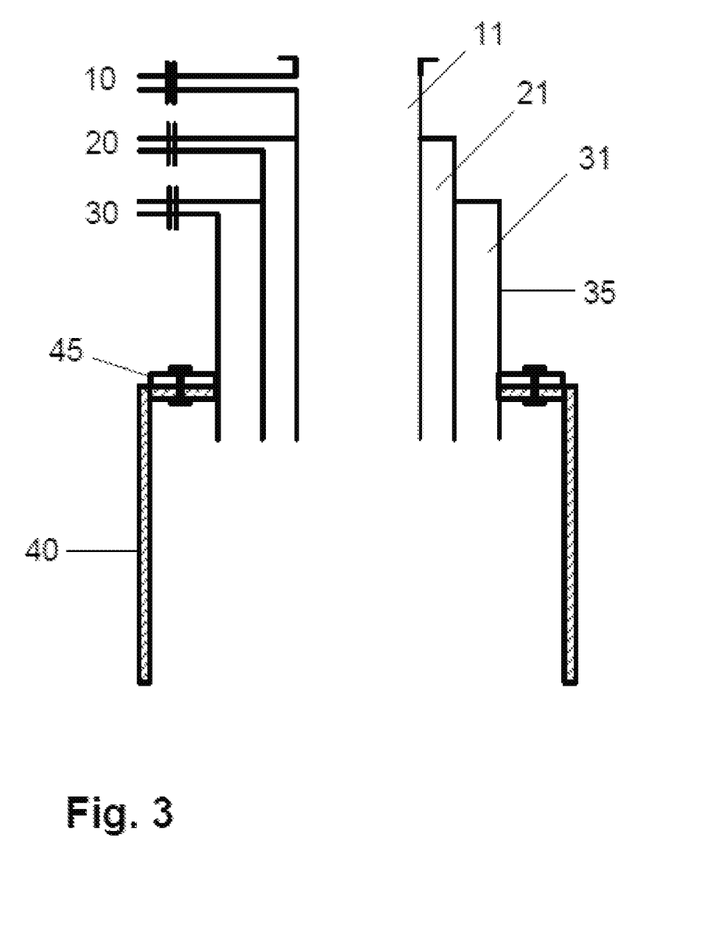
FIG. 3 shows the same POX reactor as in FIG. 2 after deinstallation of the warm-up burner.

FIG. 3 shows the same POX reactor as in FIG. 2 after completed heating up to the first target internal temperature of the reactor vessel and subsequent deinstallation of the warm-up burner from the central first feed channel.

Figure 4:
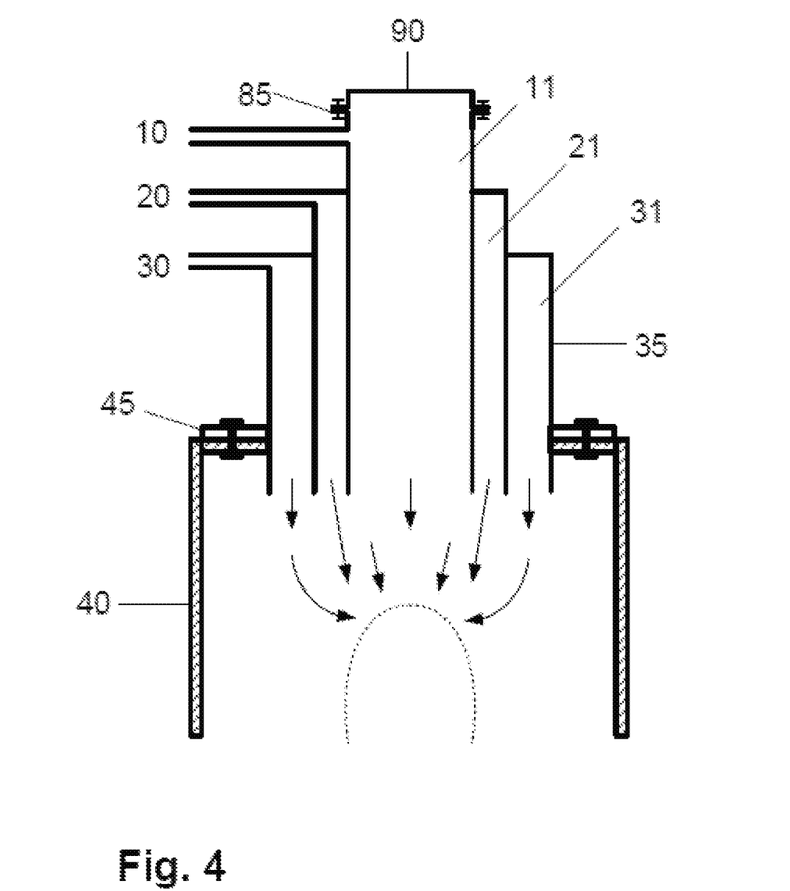
FIG. 4 shows the same POX reactor as in FIG. 2 after startup of the POX burner.

FIG. 4 shows the same POX reactor as in FIGS. 2 and 3 after startup of the POX burner/during heating up to the second target internal temperature of the reactor vessel. The central first feed channel was gastightly sealed by means of the second detachable connecting device using a closure device 90, for example a cover or a cap. The feed conduits 10, 20, 30 were opened for the purposes of feeding the oxidant, the moderator and the fluid carbon-containing fuel or the fuel gas.

Figure 5:
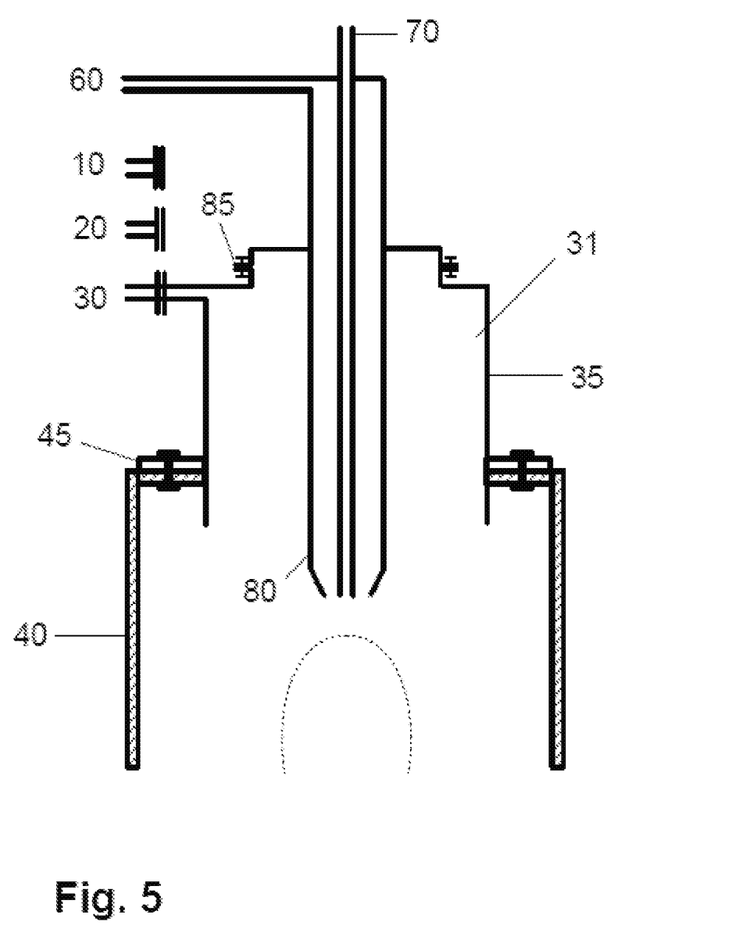
FIG. 5 shows a POX reactor according to the invention with an installed warm-up burner in an alternative configuration to FIG. 2.

FIG. 5 shows a POX reactor according to the invention with an installed warm-up burner 80 in an alternative configuration to FIG. 2. In the embodiment shown in FIG. 5 all feed conduits of the POX burner except for the outermost tube were removed. The warm-up burner was introduced into the POX burner via the third feed channel 31 and is connected to the POX burner by means of the second detachable connecting device 85. This has the advantage that a larger installation opening for installation of the warm-up burner is thus available.

LIST OF REFERENCE SYMBOLS

1 Partial oxidation reactor with POX burner
10 Oxidant feed
11 First feed channel
20 Moderator feed
21 Second feed channel
30 Fuel feed
31 Third feed channel
35 Burner outer wall
40 Reactor vessel
45 First detachable connecting device (main flange)
50 Flame
60 Feed conduit for fuel gas (fuel gas)
70 Feed conduit for oxygen-containing oxidant (air)
80 Warm-up burner
85 Second detachable connecting device (burner flange)
90 closure device
L Burner longitudinal axis It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A partial oxidation reactor having a warm-up burner for producing synthesis gas by partial oxidation of fluid carbon-containing fuels in the presence of an oxygen-containing oxidant, comprising:
   (a) a partial oxidation burner,
   (b) a reactor vessel gastightly connectable to the partial oxidation burner,
   (c) a warm-up burner gastightly connectable to the partial oxidation burner,
   wherein the partial oxidation burner comprises:
      (a1) conduits for separately supplying a fluid carbon-containing fuel, the oxygen-containing oxidant and a moderator,
      (a2) a central first feed channel which has a circular cross section,
      (a3) a second feed channel coaxially and concentrically surrounding the first feed channel, wherein an annular gap is formed between the outer wall of the first feed channel and the inner wall of the second feed channel, and
      (a4) at least one further feed channel coaxially and concentrically surrounding the first feed channel, wherein an annular gap is formed between the outer wall of the second feed channel and the inner wall of the further feed channel,
      (a5) wherein the outer wall of the outermost feed channel forms the burner outer wall of the partial oxidation burner,
      (a6) a first detachable connecting device for gastightly connecting the partial oxidation burner to the reactor vessel,
   wherein the warm-up burner comprises:
      (c1) conduits for separately supplying the carbon-containing fuel or a further fuel gas and the oxygen-containing oxidant,
      (c2) a burner outer wall of the warm-up burner having a second detachable connecting device for gastightly connecting the warm-up burner to a feed channel of the partial oxidation burner, and
      (c3) an ignition apparatus,
   wherein the first detachable connecting device and the second detachable connecting device are configured as flanges which each comprise at least one sealing element and a multiplicity of detachable securing elements, wherein:
      the at least one sealing element of the second detachable connecting device is smaller than the at least one sealing element of the first detachable connecting device, and
      the multiplicity of detachable connecting elements for the second detachable connecting device is smaller than the multiplicity of connecting elements for the first detachable connecting device.

2. The partial oxidation reactor according to claim 1 wherein the warm-up burner comprises an electrical ignition apparatus.

3. The partial oxidation reactor according to claim 1, wherein the warm-up burner comprises a flame detector.

4. The partial oxidation reactor according to claim 1, wherein the reactor vessel comprises a temperature measuring apparatus for determining the internal temperature of the reactor vessel.

5. The partial oxidation reactor according to claim 1, wherein at least one of the feed channels of the partial oxidation burner is provided with a turbulizing means.

6. The partial oxidation reactor according to claim 1, wherein at least two of the feed channels are provided with turbulizing means, wherein the directions of rotation with which the media flowing through the at least two feed channels are endowed are opposed relative to the longitudinal axis of the burner.

7. The partial oxidation reactor according to claim 1, wherein the feed channels of the partial oxidation burner are configured such that a mixing of the fuel, the moderator and the oxidant occurs only outside the burner.

8. The partial oxidation reactor according to claim 1, wherein the reactor vessel is provided with a refractory liner or lining.

9. The partial oxidation reactor according to claim 1, wherein the partial oxidation burner is operated without separately supplied cooling media.

10. A process for startup of a partial oxidation reactor for producing synthesis gas by partial oxidation of fluid carbon-containing fuels in the presence of an oxygen-containing oxidant, comprising:
  (a) providing a partial oxidation reactor according to claim 1, b) providing a carbon-containing fuel in fluid form, the oxygen containing oxidant, a moderator and a further fuel gas,
  (c) gastightly connecting the partial oxidation burner with the reactor vessel by means of the first detachable connecting device,
  (d) introducing the warm-up burner into a feed channel of the partial oxidation burner and gastightly connecting the partial oxidation burner to the warm-up burner by means of the second detachable connecting device,
  (e) sealing the conduits of the partial oxidation burner for separately supplying the carbon-containing fuel, the oxygen-containing oxidant and the moderator,
  (f) supplying the carbon-containing fuel or the further fuel gas and the oxygen-containing oxidant to the warm-up burner, mixing these gases and igniting the gas mixture using the ignition apparatus,
  (g) repeated or continuous measurement of the internal temperature of the reactor vessel using the temperature measuring apparatus,
  (h) terminating the supply of the carbon-containing fuel or the further fuel gas and the oxygen-containing oxidant to the warm-up burner when a specified first target internal temperature of the reactor vessel is achieved,
  (i) detaching the second detachable connecting device, removing the warm-up burner and sealing the resulting opening using a closure device,
  (j) opening the conduits of the partial oxidation burner for separately supplying the carbon-containing fuel, the oxygen-containing oxidant and the moderator, introducing these media into the partial oxidation reactor and reacting the carbon-containing fuels with the oxygen-containing oxidant under warm-up conditions until a specified second target internal temperature of the reactor vessel has been achieved, and
  (k) reacting the carbon-containing fuel with the oxygen-containing oxidant under conditions of partial oxidation and discharging a raw synthesis gas from the partial oxidation reactor and optionally passing the raw synthesis gas to further conditioning or processing steps.

11. The process according to claim 10, wherein,
the first target internal temperature of the reactor vessel is specified to a temperature between 600° C. and 1000° C.,
the second target internal temperature of the reactor vessel is specified to a temperature between 800° C. and 1300° C.

* * * * *